No. 850,292. PATENTED APR. 16, 1907.
T. M. BUTLER.
ICE SAW.
APPLICATION FILED FEB. 15, 1906.
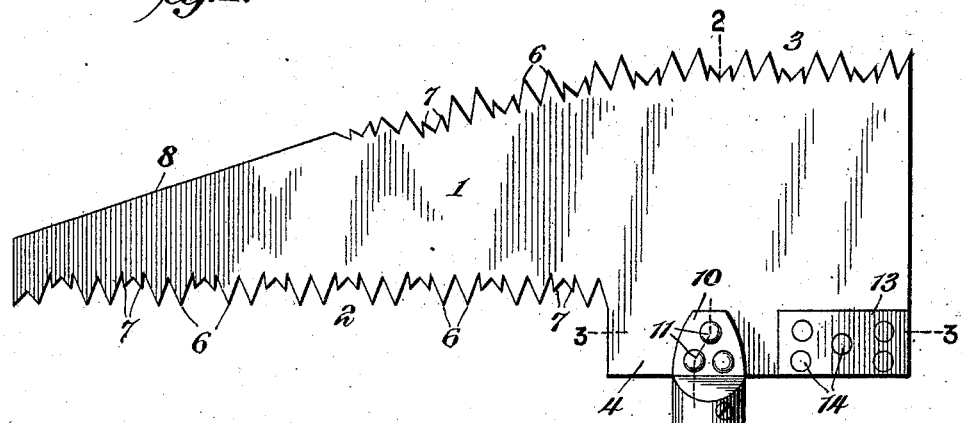
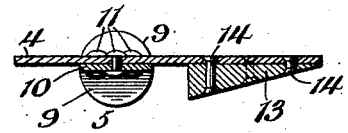
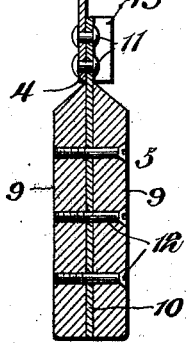
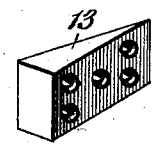
Thomas M. Butler, Inventor,
Witnesses By
Attorney

UNITED STATES PATENT OFFICE.

THOMAS M. BUTLER, OF DALLAS, TEXAS.

ICE-SAW.

No. 850,292.　　　　Specification of Letters Patent.　　　Patented April 16, 1907.

Application filed February 15, 1906. Serial No. 301,314.

*To all whom it may concern:*

Be it known that I, THOMAS M. BUTLER, a citizen of the United States, residing at Dallas, in the county of Dallas and State of Texas, have invented a new and useful Ice-Saw, of which the following is a specification.

The invention relates to improvements in ice-saws.

The object of the present invention is to improve the construction of saws and to provide a simple, inexpensive, and efficient saw designed for cutting ice while the latter is lying within an ice-box, refrigerator, or other receptacle without removing the cake of ice from which the pieces are to be cut.

A further object of the invention is to provide an ice-saw adapted to be introduced between a cake of ice and the walls of an ice-receptacle for cutting the ice with a vertical movement and capable of also sawing horizontally into the upper face of a cake when there is not sufficient space to introduce the blade of the saw between the cake and the walls of the receptacle.

Also the invention has for its object to arrange the handle of the saw in such relation with the edges of the blade that the latter will serve as a guard to prevent the hand of the operator from striking either the ice or receptacle when operating the ice-saw either vertically or horizontally.

Another object of the present invention is to provide an ice-saw having means adapted to be introduced into the kerf for breaking off a partially-severed piece of ice from the rest of the cake.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a side elevation of an ice-saw constructed in accordance with this invention. Fig. 2 is a sectional view on the line 2 2 of Fig. 1. Fig. 3 is a sectional view on the line 3 3 of Fig. 1. Fig. 4 is a detail perspective view of the wedge.

Like numerals of reference designate corresponding parts in all the figures of the drawings.

1 designates a saw-blade of general oblong shape, but preferably tapered toward one end, as clearly illustrated in Fig. 1 of the drawings. The opposite edges of the blade are provided with cutting portions 2 and 3, extending from opposite ends of the blade, and each terminating short of one end of the blade. The other end of the blade is provided with a transverse extension 4, to which is secured a handle 5. The cutting edges or portions 2 and 3 of the blade 1 are designed, respectively, for vertical and horizontal cutting, as hereinafter more fully explained, and they are preferably provided with long cutting-teeth 6 and short clearing or drag teeth 7. The cutting-teeth 6 are preferably arranged in pairs, as shown, and the clearing-teeth 7 are also arranged in pairs in the spaces between the pairs of cutting-teeth. Various other forms of teeth, however, may be employed, as will be readily understood.

The cutting edge 2, which is designed for vertical sawing, extends from the smaller end of the blade to the extension 4. The other cutting edge 3, which is designed for horizontal sawing, extends from the larger end of the blade and terminates short of the smaller end, a smooth edge 8 being provided between the inner end of the cutting edge 3 and the smaller end of the blade. The smooth edge 8, which is preferably straight, is especially advantageous, as it is adapted to come in contact with and prevent injury to the walls of the refrigerator when the blade is introduced in a vertical position into a space between a cake of ice and the walls of an ice-chamber for cutting a vertical kerf. Should the space be narrow, the saw may be used for such vertical cutting without any of its teeth coming in contact with the walls of the ice-chamber. When the space is too small to permit the saw to be reciprocated vertically, the edge 3, which is preferably curved, as shown, is employed for cutting horizontally into the upper face of the ice, the smaller end of the blade being arranged under the arm of the operator when using the saw in this position. This also brings the smooth edge 8 underneath the blade and adjacent to the body of the operator, and as the pressure on the saw is downward the smooth edge, if any, will come in contact with the clothes of the operator and will not injure the same.

The extension 4 besides increasing the strength of the blade also operates as a handguard, the handle 5 being arranged a sufficient distance from the side edges of the extension 4 to prevent the hand or hands of the operator coming in contact with either the ice or the walls of the refrigerator or other receptacle when the saw is at the limit of its movement in either direction. When the saw is used vertically and is at the limit of its downward movement, the inner side edge of the extension 4 will come in contact with the ice and will limit such downward movement. The handle in this position of the saw will be spaced a sufficient distance from the ice to prevent the hands of the operator striking the same. When the saw is used horizontally, the outer side edge of the extension 4 will limit the outward movement of the saw by coming in contact with the wall of the ice-chamber, and the handle will be spaced a sufficient distance from the same to avoid the hands of the operator coming in contact with the said wall.

The handle, which may be of any desired construction and which is round, as shown, preferably consists of two sections or members 9 and a metallic plate or piece 10, which extends from the inner end of the handle and which is secured by rivets 11 or other suitable fastening devices to the extension 4 of the blade. The sections 9 are secured to the metal plate by means of screws 12 or other suitable fastening devices, which pierce each of the sections and the said blade, as clearly shown in Fig. 2 of the drawings.

The extension 4 of the saw-blade is also designed to receive a wedge 13, arranged longitudinally of the blade at right angles to the handle 5 and having one side and end arranged flush with the adjacent edges of the blade 1 at the outer corner of the extension 4, as clearly shown in Fig. 1 of the drawings. The wedge, which has its smaller end arranged at the large end of the blade, is secured by rivets 14 or other suitable fastening devices to the blade. The wedge enables the saw to be introduced into a kerf for breaking off a partially-severed piece of ice.

The saw may be made of any desired size to suit the character of its use, and a piece of ice is severed from a cake by cutting into the same at right angles until the kerfs intersect. The piece may then be readily broken off and removed without shattering and wasting the ice. Also after a piece has been removed from the ice-chamber or other receptacle it may be readily cut into smaller pieces.

It will be seen that the saw, which is simple and inexpensive in construction, is strong and durable and that it is adapted to be conveniently used for cutting into a cake of ice either at the top or sides thereof and that pieces of the desired size may be accurately cut and removed without waste.

Having thus fully described my invention, what I claim as new, and desire to secure by Letters Patent, is—

1. An ice-saw comprising a substantially oblong blade provided with opposite longitudinal cutting edges extending from the opposite ends of the blade and being of a length less than the length of the blade to leave smooth longitudinal edges, the latter being arranged at the opposite ends of the blade, and a handle attached to the blade at one of the said smooth longitudinal edges, the other smooth longitudinal edge forming a guard to prevent injury to the walls of an ice-receptacle when the saw is operated at the side of a cake of ice.

2. An ice-saw comprising a substantially oblong longitudinally-tapered blade, provided at its longitudinal edges with opposite cutting portions extending from the opposite ends of the blade, and being of a length less than the length of the blade to leave smooth longitudinal edges at the opposite ends of the blade, one of the said cutting portions being curved, and the blade being provided at its opposite longitudinal edge with an extension, and a handle secured to the said extension.

3. An ice-saw comprising a blade provided at its longitudinal edges with cutting portions extending from the opposite ends of the blade and being of a length less than the length of the blade to leave smooth longitudinal edges at the opposite ends of the blade, the latter being provided with an extension at one of the smooth portions, and a handle extending from the blade at right angles thereto and spaced from the side edges of the extension a sufficient distance to provide handguards.

4. An ice-saw comprising a saw-blade, and a wedge secured flat against one of the side faces of the saw-blade and extending throughout its length along the said saw-blade and having its small end located at one edge of the same, whereby the wedge is adapted to be introduced into a kerf cut by the saw for separating a partially-severed piece of ice from the rest of the cake.

5. An ice-saw comprising a blade having a substantially rectangular extension located at one side of the blade at one end thereof, a handle attached to the extension, and a wedge also secured to the extension at one corner thereof, one end and side of the wedge being flush with the adjacent edge of the blade.

6. An ice-saw comprising a blade, a handle arranged at an angle to the blade at a point between the ends thereof, and a wedge arranged longitudinally of and fitted to the blade at the corner thereof at one side of and at an angle to the handle.

7. An ice-saw comprising a blade, a handle extending from the blade at an angle thereto, and a wedge fitted to and against the blade and arranged at right angles to and at one side of the handle, the small end of the wedge being located at one edge of the blade and the large end of the wedge being disposed toward the handle.

8. An ice-saw comprising a substantially oblong blade provided with opposite longitudinal cutting edges, one of the cutting edges terminating short of the length of the blade, from which point the blade is formed into a transverse enlargement or extension, and a handle projecting from the blade at the enlargement or extension and arranged at an angle thereto, said extension being arranged to form a guard to prevent the hand of the operator from coming in contact with the ice or the ice-box.

9. An ice-saw comprising a substantially oblong blade provided with opposite longitudinal cutting edges, each of which is less than the length of the blade, a transverse extension being provided at one end of the blade, and a handle attached to the said extension at a point between the opposite edges thereof.

In testimony that I claim the foregoing as my own I have hereto affixed my signature in the presence of two witnesses.

THOMAS M. BUTLER.

Witnesses:
O. W. LATHAM,
ROBERT H. HAMILTON.